(12) United States Patent
Shin et al.

(10) Patent No.: US 11,215,892 B2
(45) Date of Patent: Jan. 4, 2022

(54) DISPLAY DEVICE

(71) Applicant: Samsung Display Co., Ltd., Yongin-Si (KR)

(72) Inventors: Kyeong Hwan Shin, Suwon-si (KR); Kyu Su Ahn, Seoul (KR); Dong Il Yoo, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/885,272

(22) Filed: May 28, 2020

(65) Prior Publication Data

US 2021/0132456 A1 May 6, 2021

(30) Foreign Application Priority Data

Nov. 1, 2019 (KR) .................. 10-2019-0138741

(51) Int. Cl.
*G02F 1/1362* (2006.01)
*G02F 1/1368* (2006.01)
*G02F 1/1335* (2006.01)
*G02F 1/1337* (2006.01)

(52) U.S. Cl.
CPC ...... *G02F 1/136286* (2013.01); *G02F 1/1368* (2013.01); *G02F 1/133512* (2013.01); *G02F 1/133707* (2013.01); *G02F 2201/121* (2013.01); *G02F 2201/122* (2013.01); *G02F 2201/123* (2013.01)

(58) Field of Classification Search
CPC ......... G02F 1/136286; G02F 2201/122; G02F 1/133707; G02F 2201/123
See application file for complete search history.

(56) References Cited

U.S. PATENT DOCUMENTS

| 2010/0157232 A1* | 6/2010 | Kim | G02F 1/1393 349/144 |
|---|---|---|---|
| 2010/0182557 A1* | 7/2010 | You | G02F 1/1393 349/141 |
| 2011/0242468 A1* | 10/2011 | Choi | G02F 1/133753 349/129 |
| 2015/0234240 A1* | 8/2015 | Tae | G02F 1/13439 257/91 |

(Continued)

FOREIGN PATENT DOCUMENTS

| KR | 10-2010-0085518 A | 7/2010 |
|---|---|---|
| KR | 10-1377169 B1 | 3/2014 |

(Continued)

*Primary Examiner* — Jia X Pan
(74) *Attorney, Agent, or Firm* — Innovation Counsel LLP

(57) ABSTRACT

The display device according to an exemplary embodiment of the present inventive concept includes: a signal line extending in a direction perpendicular to a first direction; a transistor electrically connected to the signal line; and a pixel electrode electrically connected to the transistor and including a branch electrode, wherein the branch electrode incudes a first portion and a second portion extending from the first portion and extending in a direction different from an extending direction of the first portion, an acute angle formed between an extending direction of the second portion and the first direction is smaller than an acute angle formed between the extending direction of the first portion and the first direction, and the signal line overlaps the second portion in a plan view.

20 Claims, 20 Drawing Sheets

(56) References Cited

U.S. PATENT DOCUMENTS

2016/0026050 A1* 1/2016 Lin .................. G02F 1/136286
349/43

FOREIGN PATENT DOCUMENTS

| KR | 10-1502358 B1 | 3/2015 |
| KR | 10-2015-0039404 A | 4/2015 |
| KR | 10-2015-0117414 A | 10/2015 |
| KR | 10-2016-0014851 A | 2/2016 |

* cited by examiner

DISPLAY DEVICE

CROSS-REFERENCE TO RELATED APPLICATION

This application claims priority to and the benefit of Korean Patent Application No. 10-2019-0138741 filed in the Korean Intellectual Property Office on Nov. 1, 2019, the entire contents of which are incorporated herein by reference.

BACKGROUND (a) Field

The present disclosure relates to a display device.

(b) Description of the Related Art

A display device includes a display panel including a plurality of pixels capable of displaying an image. Each pixel may include a pixel electrode receiving a data signal, and the pixel electrode is connected to at least one transistor to receive a data voltage.

Among various display devices, a liquid crystal display includes field generating electrodes including the pixel electrode and a common electrode, and a liquid crystal layer interposed therebetween. The liquid crystal display applies a voltage to the field generating electrodes to generate an electric field to the liquid crystal layer, such that a direction of liquid crystal molecules in the liquid crystal layer is altered and a desired image may be displayed by controlling polarization of incident light.

The above information disclosed in this Background section is only for enhancement of understanding of the background of the inventive concept and therefore it may contain information that does not form the prior art that is already known in this country to a person of ordinary skill in the art.

SUMMARY

As a display device having high resolution is developed, a signal line may be disposed in a transmissive region of each pixel as the size of the pixel becomes smaller and the transmissive region of each pixel becomes smaller. In such a case, if dispersion occurs in the width, position, or the like of the signal line in the process of forming the signal line, it also affects the dispersion of the transmittance of the pixel. The present disclosure is intended to minimize the dispersion of the transmittance of the pixel in the display device in which the signal line is disposed in the transmissive region of the pixel.

A display device according to an exemplary embodiment of the present inventive concept includes: a signal line extending in a direction perpendicular to a first direction; a transistor electrically connected to the signal line; and a pixel electrode electrically connected to the transistor and including a branch electrode, wherein the branch electrode incudes a first portion and a second portion extending from the first portion and extending in a direction different from an extending direction of the first portion, an acute angle formed between an extending direction of the second portion and the first direction is smaller than an acute angle formed between the extending direction of the first portion and the first direction, and the signal line overlaps the second portion in a plan view.

A plurality of pixels may be included, each pixel may include a transmissive region through which light is capable of being transmitted and a light blocking region through which light is not capable of being transmitted, the transistor may be disposed in the light blocking region, and the signal line may extend in the direction perpendicular to the first direction at the transmissive region.

Two parallel edges of the signal line may overlap the second portion.

A width of the second portion in the first direction may be greater than or equal to a width of the signal line in the first direction.

The signal line may be a data line transmitting a data voltage to the transistor.

The branch electrode may further include a third portion extending from the second portion, the second portion may be disposed between the first portion and the third portion, and an acute angle formed between the extending direction of the second portion and the first direction may be smaller than an acute angle formed between an extending direction of the third portion and the first direction.

The extending direction of the first portion and the extending direction of the third portion may be the same.

A width of the first portion and a width of the third portion may be constant.

The pixel electrode may further include: a transverse stem extending in a different direction from the extending direction of the first portion; and a longitudinal stem extending in a direction perpendicular to the extending direction of the transverse stem, and intersecting the transverse stem, and the branch electrode may extend obliquely from the transverse stem or the longitudinal stem.

The display device may further include a common electrode opposing the pixel electrode and a liquid crystal layer including liquid crystal molecules and interposed between the pixel electrode and the common electrode.

A display device according to an exemplary embodiment includes a pixel including: a transmissive region and a light blocking region; a signal line extending in a first direction in the transmissive region; a pixel electrode disposed at the transmissive region; and a transistor disposed at the light blocking region, wherein the pixel electrode includes a branch electrode including a first portion and a second portion extending in directions different from each other, the first portion extends in a direction different from the first direction and a second direction which extends perpendicular to the first direction, and the signal line overlaps the second portion in a plan view.

A display device according to an exemplary embodiment includes: a substrate; a signal line and a transistor disposed on the substrate; and a pixel electrode disposed on the transistor and the signal line, wherein the pixel electrode includes a branch electrode including a first portion and a second portion extending in different directions from each other in a plan view, an acute angle formed between a direction perpendicular to an extending direction of the signal line and an extending direction of the second portion is smaller than an acute angle formed between the direction perpendicular to the extending direction of the signal line and the extending direction of the first portion in a plan view, and the signal line overlaps the second portion in a plan view.

According to an exemplary embodiment of the present inventive concept, in the display device in which the signal line is disposed in the transmissive region of the pixel, the dispersion of the transmittance of the pixel may be minimized.

DETAILED DESCRIPTION OF THE EMBODIMENTS

Figure 1:
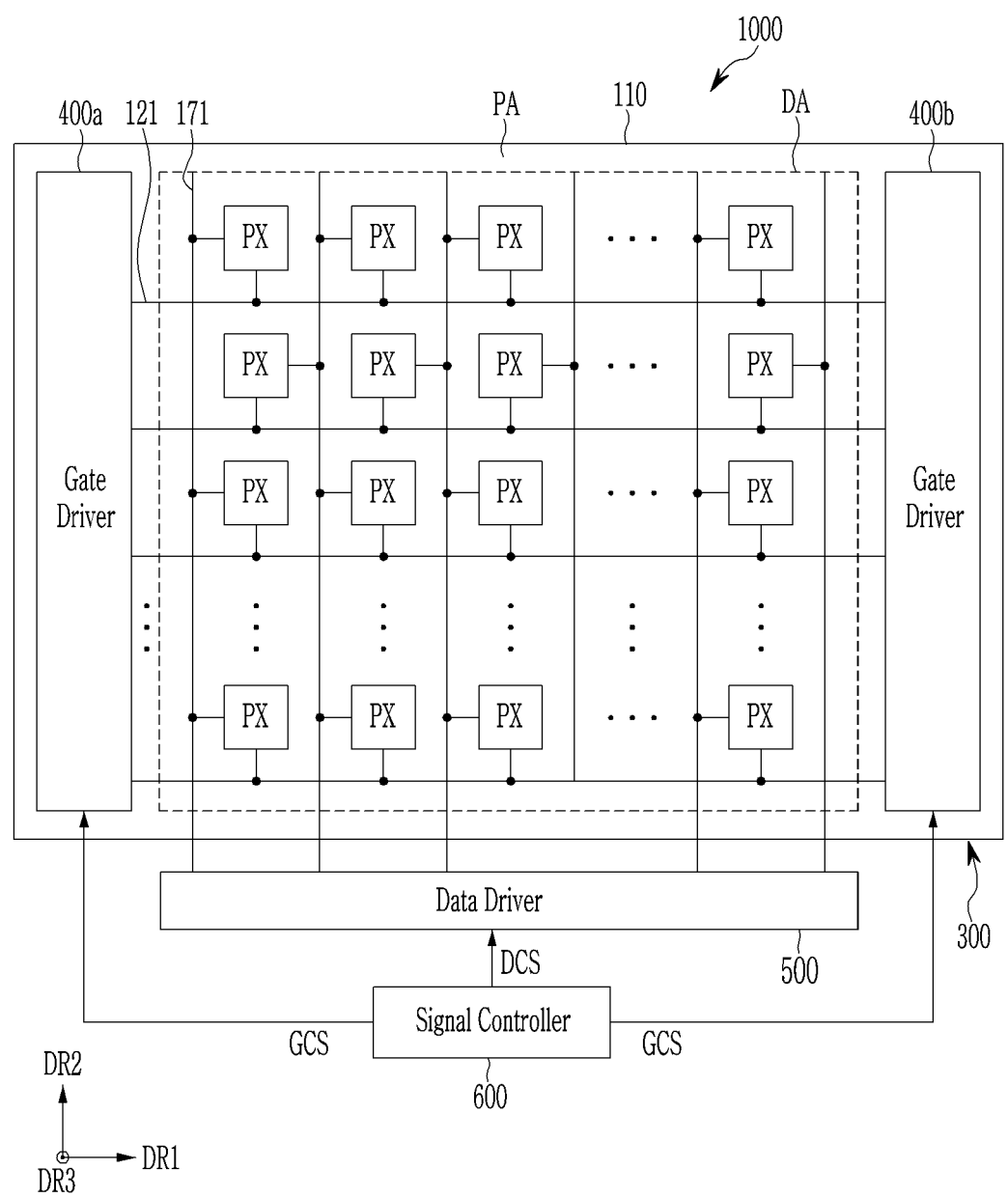
FIG. 1 is a schematic layout view of a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Descriptions of parts not related to the present inventive concept are omitted, and like reference numerals designate like elements throughout the specification.

Further, in the drawings, a size and thickness of each element are arbitrarily represented for better understanding and ease of description, and the present inventive concept is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Throughout this specification, a plan view means a view when observing a surface parallel to two directions (e.g., a first direction DR1 and a second direction DR2) crossing each other, and a cross-sectional view means a view when observing a surface cut in a direction (e.g., a third direction DR3) perpendicular to the surface parallel to the first direction DR1 and the second direction DR2. Also, to overlap two constituent elements means that two constituent elements are overlapped in the third direction DR3 (e.g., a direction perpendicular to an upper surface of the substrate) unless stated otherwise.

Now, a display device according to an exemplary embodiment of the present inventive concept is described with reference to FIG. 1.

FIG. 1 is a schematic layout view of a display device according to an exemplary embodiment of the present inventive concept, Referring to FIG. 1, a display device 1000 according to an exemplary embodiment of the present inventive concept includes a display panel 300 including a display area DA and a peripheral area PA disposed outside the display area DA to surround the display area DA. The display panel 300 includes a first substrate 110.

The display area DA is an area which is capable of displaying an image according to an input image signal, and includes a plurality of pixels PX, a plurality of gate lines 121, and a plurality of data lines 171.

The pixel PX is a basic unit for displaying an image, and each pixel PX may include at least one transistor and at least one pixel electrode electrically connected to the transistor. Each pixel PX may have a transmissive region through which light may be transmitted, and a light blocking region through which light may be relatively low or light may not be transmitted.

The plurality of pixels PX may be regularly arranged, for example, in a matrix form.

In order to represent various colors, each pixel PX may display one of primary colors, and an image of a desired color may be recognized by a spatial and temporal sum of these primary colors. The primary colors may include, for example, three primary colors such as red, green, and blue, and may further include white.

The gate line 121 may transfer a gate signal including a gate-on voltage and a gate-off voltage. The plurality of gate lines 121 may be generally arranged in parallel with each other in the second direction DR2, and each of the gate lines 121 may extend in the first direction DR1.

The data line 171 may transmit a data voltage corresponding to the input image signal. The plurality of data lines 171 may be generally arranged in a direction parallel to the first direction DR1, and each of the data lines 171 may generally extend in the second direction DR2.

Referring to FIG. 1, the plurality of pixels PX disposed in one pixel column extending in the second direction DR2 may be alternately electrically connected to two adjacent data lines 171. For example, as shown in FIG. 1, the plurality of pixels PX of each pixel column may be alternately connected to two data lines 171 on a basis of one pixel row (or periodically). According to another exemplary embodiment, the plurality of pixels PX of each pixel column may be alternately connected to two adjacent data lines 171 on a basis of two or more pixel rows.

The peripheral area PA may be an area that mostly does not display the image and is an area adjacent to the display area DA. For example, the peripheral area PA may surround the display area DA. However, in some cases, at least a portion of the peripheral area PA may display the image.

The peripheral area PA may include gate drivers 400a and 400b.

The gate drivers 400a and 400b may be electrically connected to the plurality of gate lines 121 to apply a gate signal. FIG. 1 illustrates an example in which the first gate driver 400a is disposed in the peripheral area PA disposed on the left side of the display area DA, and the second gate driver 400a is disposed in the peripheral area PA disposed on the right side of the display area DA. The gate drivers 400a and 400b may generate the gate signal including the gate-on voltage and the gate-off voltage, and may sequentially apply the gate signal to the plurality of gate lines 121 in a direction parallel to the second direction DR2.

The gate drivers 400a and 400b may be directly formed in the peripheral area PA in the same process together with an electrical element such as a transistor of the display area DA. One of the first and second gate drivers 400a and 400b may be omitted.

The display apparatus 1000 according to an exemplary embodiment of the present inventive concept may further include a data driver 500 and a signal controller 600.

The data driver 500 is electrically connected to the plurality of data lines 171. The data driver 500 may selectively apply a data voltage, which is a gray voltage corresponding to the input image signal, to the corresponding data line 171 under the control of the signal controller 600.

The signal controller 600 may control the gate drivers 400a and 400b and the data driver 500 by sending control signals GCS and DCS to the gate drivers 400a and 400b and the data driver 500.

The data driver 500 and/or the signal controller 600 may be mounted on the peripheral area PA of the display panel 300 in a form of a plurality of driving chips, or may be mounted on a flexible printed circuit film or a printed circuit board, which is electrically connected to the display panel 300.

Next, a detailed structure of the display device according to an exemplary embodiment of the present inventive concept is described with reference to FIG. 2 to FIG. 7 as well as FIG. 1 described above.

Figure 2:
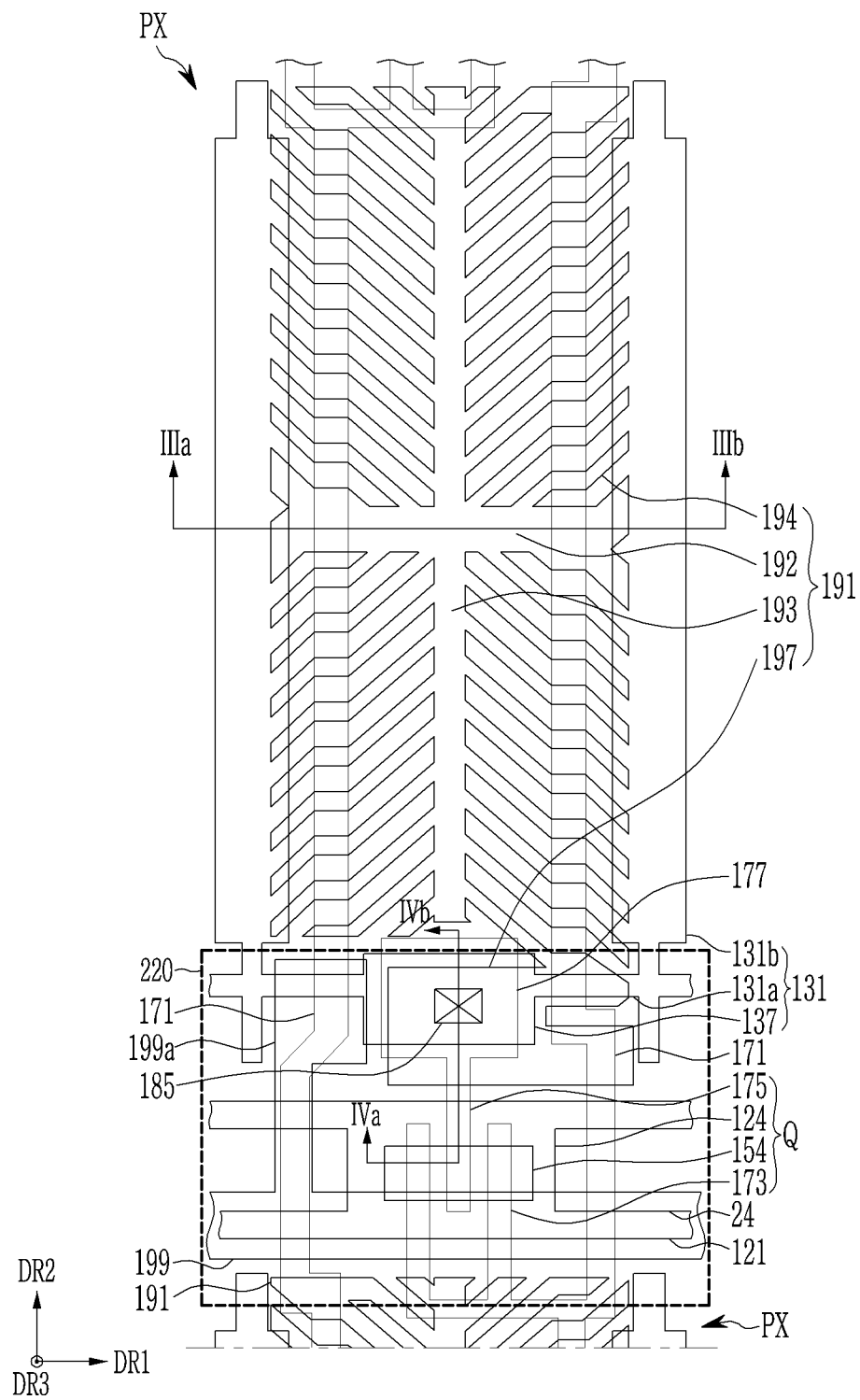
FIG. 2 is a layout view of one pixel of a display device according to an exemplary embodiment of the present inventive concept.
Figure 3:
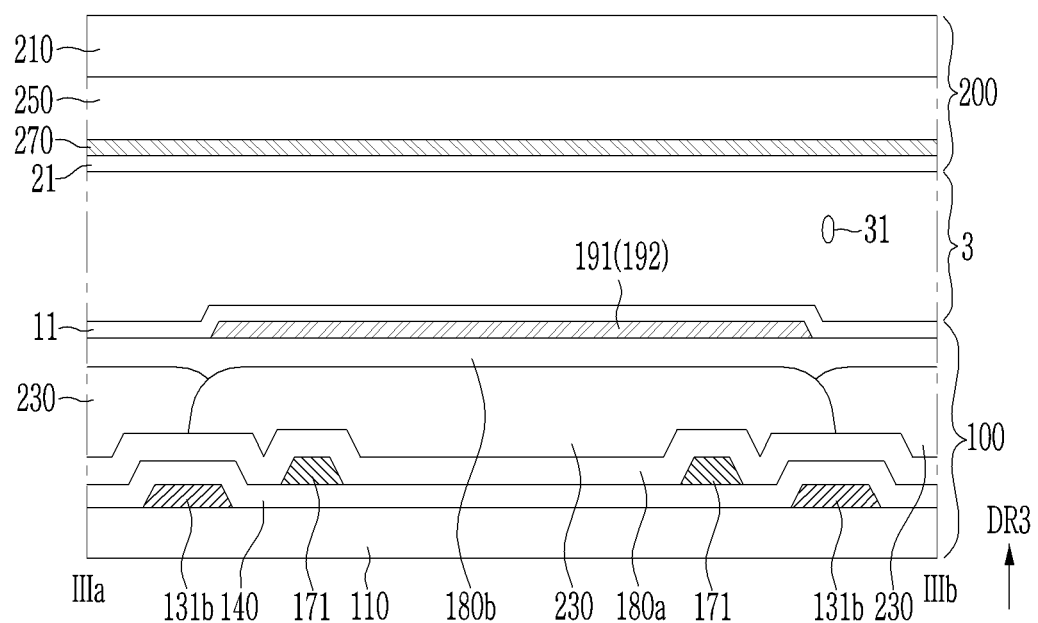
FIG. 3 is a cross-sectional view of a display device shown in FIG. 2 taken along a line IIIa-IIIb.
Figure 4:
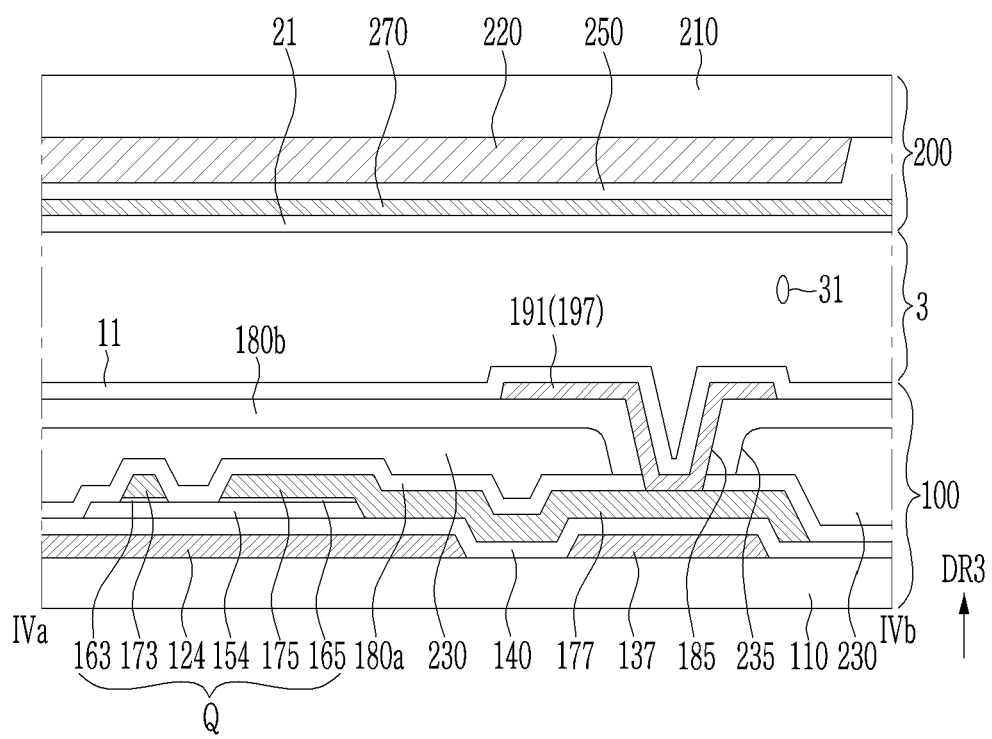
FIG. 4 is a cross-sectional view of a display device shown in FIG. 2 taken along a line IVa-IVb.
Figure 5:
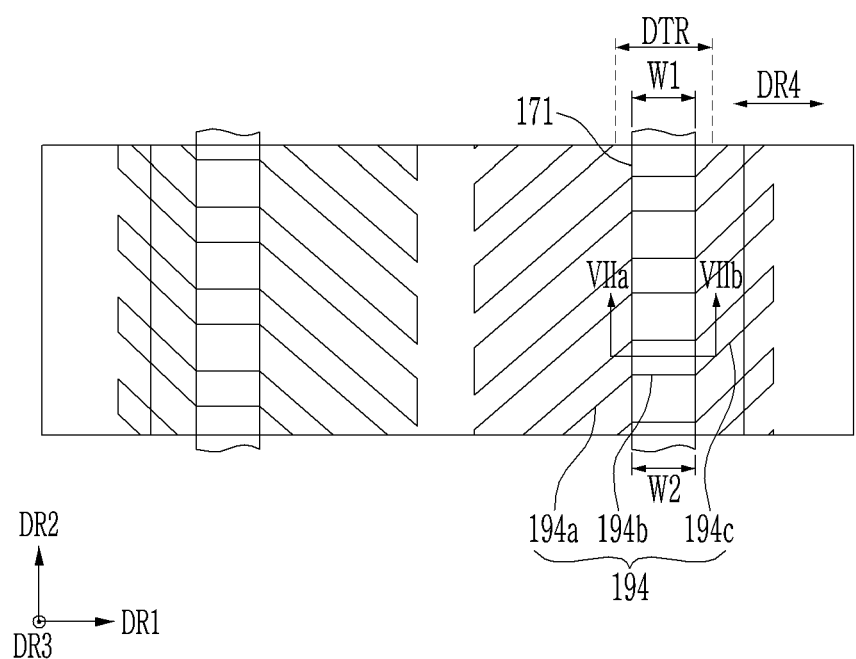
FIG. 5 is a top plan view showing a part of one pixel of a display device according to an exemplary embodiment of the present inventive concept.
Figure 6:
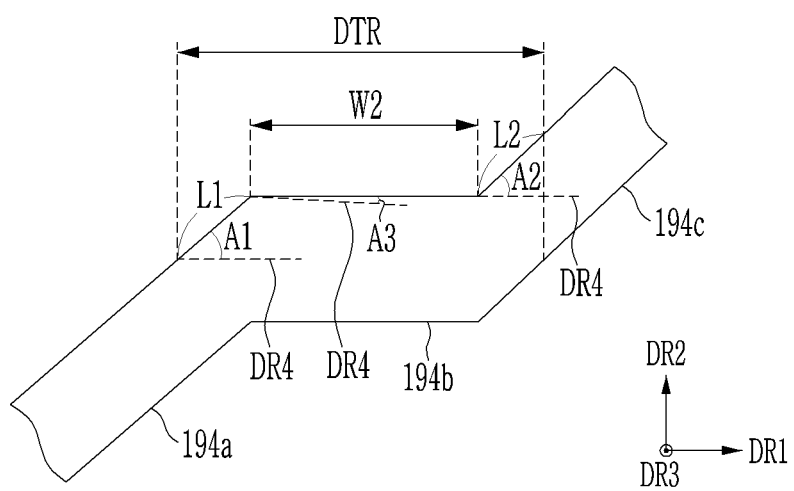
FIG. 6 is a top plan view showing a part of a pixel electrode of a display device according to an exemplary embodiment of the present inventive concept.
Figure 7:
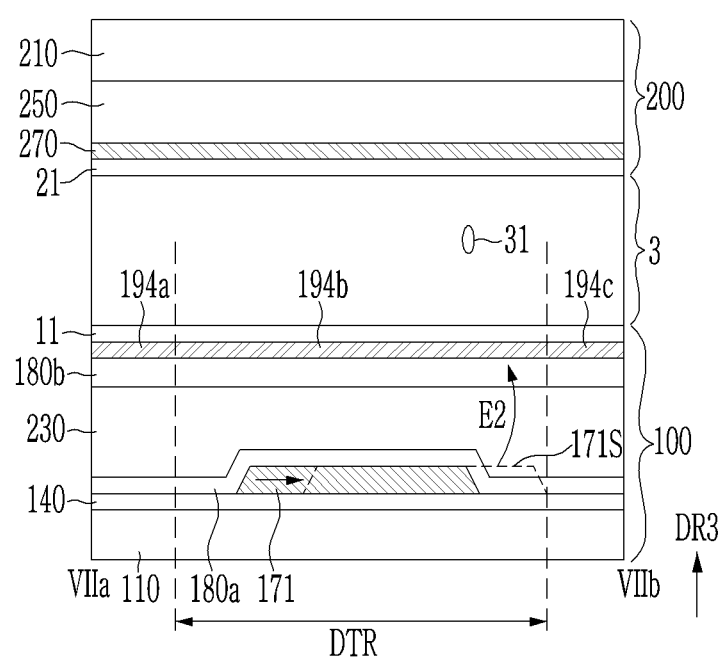
FIG. 7 is a cross-sectional view of a display device shown in FIG. 5 taken along a line VIIa-VIIb.

FIG. 2 is a layout view of one pixel of a display device according to an exemplary embodiment of the present inventive concept, FIG. 3 is a cross-sectional view of a display device shown in FIG. 2 taken along a line IIIc-IIIb, FIG. 4 is a cross-sectional view of a display device shown in FIG. 2 taken along a line IVa-IVb, FIG. 5 is a top plan view showing a part of one pixel of a display device according to an exemplary embodiment of the present inventive concept, FIG. 6 is a top plan view showing a part of a pixel electrode of a display device according to an exemplary embodiment of the present inventive concept, and FIG. 7 is a cross-sectional view of a display device shown in FIG. 5 taken along a line VIIa-VIIb.

First, referring to FIG. 3 and FIG. 4, the display device according to an exemplary embodiment of the present inventive concept may include a first display panel 100 and a second display panel 200 facing each other, and a liquid crystal layer 3 disposed between two display panels 100 and 200. The first display panel 100 includes a first substrate 110, and the second display panel 200 includes a second substrate 210. Here, the term "up" with respect to the first substrate 110 means an upper side of the surface facing the liquid crystal layer 3, and the term "below" with respect to the second substrate 210 means a lower side of the surface facing the liquid crystal layer 3.

Referring to the first display panel 100, a plurality of gate lines 121 and a plurality of storage electrode lines 131 may be disposed on the first substrate 110. The gate line 121 and the storage electrode line 131 may be formed of the same gate conductive layer.

Referring to FIG. 2, each gate line 121 may transmit a gate signal and may extend in a direction substantially parallel to the first direction DR1. Each gate line 121 may include a plurality of gate electrodes 124. The gate line 121 may have openings 24 disposed on both sides of the gate electrode 124 in the first direction DR1.

The storage electrode line 131 is disposed spaced apart from the gate line 121 and may transmit a constant voltage. Each storage electrode line 131 may include a transverse portion 131a and a longitudinal portion 131b.

The transverse portion 131a may extend in a direction substantially parallel to the first direction DR1. The transverse portion 131a may include an expanded portion 137 disposed in each pixel PX.

The longitudinal portion 131b may protrude in the second direction DR2 from the horizontal portion 131a and may extend in the second direction DR2. The longitudinal part 131b may be disposed between two pixels PX adjacent in the first direction DR1.

A gate insulating layer 140 may be disposed on the gate conductive layer. The gate insulating layer 140 may include an insulating material such as a silicon nitride (SiNx), a silicon oxide (SiOx), a silicon oxynitride, and the like.

A semiconductor layer including a plurality of semiconductor patterns 154 may be disposed on the gate insulating layer 140. The semiconductor layer may include a semiconductor material such as amorphous silicon, polycrystalline silicon, or a metal oxide.

Each semiconductor patterns 154 may be disposed on each gate electrode 124 to overlap the gate electrode 124 in a plan view (or in a direction perpendicular to the top surface of the first substrate 110).

Ohmic contact layers 163 and 165 may be disposed on the semiconductor layer. The ohmic contact layers 163 and 165 may include an n+ hydrogenated amorphous silicon in which n-type impurities such as phosphorus are heavily doped or a silicide.

On the ohmic contact layers 163 and 165 and the gate insulating layer 140, a data conductive layer including a plurality of data lines 171, a plurality of source electrodes 173, and a plurality of drain electrodes 175 may be disposed.

Each data line 171 may transmit a data voltage, and may generally extend in a direction parallel to the second direction DR2 to cross the gate line 121 and the storage electrode line 131.

The source electrode 173 disposed in each pixel PX may be electrically connected to the corresponding data line 171 to receive the data voltage. Each source electrode 173 may include a portion overlapping the gate electrode 124 and bent to have an approximately U letter shape. However, the shape of the source electrode 173 is not limited to features disclosed in FIG. 2.

The drain electrode 175 is spaced apart from the data line 171 and the source electrode 173.

Each drain electrode 175 may include one end portion facing the source electrode 173 and surrounded by the curved portion of the source electrode 173 in a region overlapping the gate electrode 124 and the semiconductor pattern 154. The drain electrode 175 may include an expanded portion 177 disposed at the other end thereof. The expanded portion 177 may be disposed above the gate line 121 in a plan view.

In a plan view, the expanded portion 177 may overlap the expanded portion 137 of the storage electrode line 131. The expanded portion 177 of the drain electrode 175 and the expanded portion 137 of the storage electrode line 131 overlapping each other with the gate insulating layer 140 interposed therebetween may form a storage capacitor which maintains the charged voltage of the pixel PX.

The opening 24 of the gate line 121 overlaps the data line 171 which crosses the gate line 121, thereby reducing a signal delay due to parasitic capacitance formed between the gate line 121 and the data line 171.

The ohmic contact layers 163 and 165 exist only between the semiconductor pattern 154 and the data conductive layer and may lower the contact resistance between the semiconductor pattern 154 and the data conductive layer.

The gate conductive layer and the data conductive layer may include at least one metal selected from the group consisting of copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), and alloys thereof.

The gate electrode 124, the source electrode 173, and the drain electrode 175 together with the semiconductor pattern 154 form a thin film transistor Q which is a switching element. The channel of the thin film transistor Q is formed in the semiconductor pattern 154 between the source electrode 173 and the drain electrode 175.

An insulating layer 180a may be disposed on the data conductive layer and a plurality of color filters 230 may be disposed on the insulating layer 180a. The color filter 230 may represent one of primary colors such as three primary colors of red, green, and blue, or four primary colors. A plurality of color filters representing different primary colors may be alternately disposed in the first direction DR1 in a plan view.

The color filter 230 may have an opening 235 disposed over the expanded portion 177 of the drain electrode 175.

An insulating layer 180b may be disposed on the color filter 230.

The insulating layer 180a and the insulating layer 180b may include an inorganic insulating material such as a silicon nitride, a silicon oxide, and a silicon oxynitride, and/or an organic insulating material. For example, the insulating layer 180a may include an inorganic insulating material, and the insulating layer 180b may include an organic insulating material. In this case, the top surface of the insulating layer 180b may be substantially flat. The insulating layer 180b serves as an overcoat for the color filter 230 to prevent the color filter 230 from being exposed and impurities such as pigments included in the color filter 230 from permeating into the liquid crystal layer 3.

The insulating layer 180a and the insulating layer 180b may have an opening 185 disposed on the expanded portion 177 of the drain electrode 175 and overlapping the expanded portion 177. The opening 185 may be disposed in the opening 235 of the color filter 230.

A pixel electrode layer including a plurality of pixel electrodes 191 and a shielding electrode 199 may be disposed on the insulating layer 180b.

The overall shape of each pixel electrode 191 may be a polygon such as a quadrangle, and at least a portion of the pixel electrode 191 may be removed.

In detail, portions of the pixel electrode 191 may be removed to include a plurality of branch portions 194. The branch portion 194 may include a portion extending in an oblique direction with respect to the first direction DR1 and the second direction DR2. The pixel electrode 191 disposed between adjacent branch portions 194 is removed to form a plurality of slits.

The pixel electrode 191 may further include a transverse stem 192, a longitudinal stem 193, and an expanded portion 197 in addition to the branch portion 194.

The transverse stem 192 generally extends in a direction parallel to the first direction DR1 and the longitudinal stem 193 extends in a direction substantially parallel to the second direction DR2 to intersect the transverse stem 192. The transverse stem 192 and the longitudinal stem 193, which cross each other and are connected to each other, may form a cross shape together.

The branch portion 194 may be connected to or extend from the transverse stem 192 or the longitudinal stem 193.

The expanded portion 197 may overlap the expanded portion 177 of the drain electrode 175 in a plan view. The expanded portion 197 is electrically connected to the expanded portion 177 of the drain electrode 175 through the opening 185 of the insulating layers 180a and 180b, whereby the pixel electrode 191 receive the data voltage from the drain electrode 175.

The expanded portion 197 may overlap the data line 171.

The left and right edge portions of the pixel electrode 191 may overlap or not overlap the longitudinal portion 131b of the storage electrode line 131 as illustrated.

The shielding electrode 199 is spaced apart from the pixel electrode 191 and may generally extend in the first direction DR1 to overlap the gate line 121. Referring to FIG. 2, the shielding electrode 199 overlaps the lower edge of the gate line 121 to prevent coupling between the pixel electrode 191 of another pixel PX disposed below the gate line 121 and the gate line 121, thereby preventing the signal delay of the gate line and preventing light leakage between the pixel electrode 191 and the gate line 121.

The shielding electrode 199 may include a protrusion 199a overlapping the other data line 171 that does not overlap the expanded portion 197 of the pixel electrode 191.

The pixel electrode layer may include a transparent conductive material such as indium-tin oxide (ITO), indium-zinc oxide (IZO) and a metal thin film.

Referring to the second display panel 200, a light blocking member 220 may be disposed under the second substrate 210 as shown in FIG. 4.

Referring to FIG. 2, in a plan view, the light blocking member 220 may be disposed between the pixel electrodes 191 neighboring in the second direction DR2 to prevent light leakage between the neighboring pixels PX. In a plan view, the light blocking member 220 may mainly extends in a direction parallel to the first direction DR1. The light blocking member 220 may prevent the light leakage by overlapping most of the region where the thin film transistor Q, the gate line 121, and the drain electrode 175 are located.

Meanwhile, as described above, the longitudinal portion 131b of the storage electrode line 131 overlaps most of the space between two pixel electrodes 191 neighboring in the first direction DR1 to prevent the light leakage between the pixels PX neighboring in the first direction DR1.

The light blocking region of each pixel PX includes the light blocking member 220 and the longitudinal portion 131b of the storage electrode line 131, and the transmissive region of each pixel PX may be defined by a region enclosed by the light blocking member 220 and the longitudinal portion 131b of the storage electrode line 131. The thin film transistor Q may be disposed in the light blocking region in which the light blocking member 220 is disposed to overlap the light blocking member 220.

According to the present exemplary embodiment, the data line 171 may include a portion disposed in the transmissive region of the pixel PX to overlap the pixel electrode 191. As illustrated in FIG. 2, the data line 171 may be bent at least once in the light blocking area or in an area adjacent to the light blocking area. Referring to FIG. 2, two data lines 171 may pass through the transmissive region within one pixel PX, but it is not limited thereto.

Again, referring to FIG. 3 and FIG. 4, an insulating layer 250 may be disposed under the light blocking member 220 and a common electrode 270 may be disposed under the insulating layer 250.

The insulating layer 250 may include an inorganic insulating material and/or an organic insulating material. The insulating layer 250 may prevent the light blocking member 220 from being exposed to the outside, and prevent a material such as carbon black included in the light blocking member 220 from permeating into the liquid crystal layer 3.

The common electrode 270 may be continuously formed in most of regions corresponding to the display area DA. The common electrode 270 may include a transparent conductive material such as ITO or IZO, or a metal such as aluminum, silver, chromium, and alloys thereof.

Unlike the above description, the color filter 230 may be disposed on the second display panel 200.

The liquid crystal layer 3 may include liquid crystal molecules 31 having dielectric anisotropy. The liquid crystal molecules 31 may be aligned such that their major axes are arranged approximately perpendicular or at an acute angle with respect to the surfaces of the substrates 110 and 210 in the absence of an applied electric field in the liquid crystal layer 3.

An alignment layer 11 may be disposed on the pixel electrode 191 and the insulating layer 180b, and an alignment layer 21 may be disposed below the common electrode 270. Each of two alignment layers 11 and 21 may be a vertical alignment layer.

If the data voltage is applied to the pixel electrode 191 and the common voltage is applied to the common electrode 270, the electric field is generated to the liquid crystal layer 3. The electric field may include a vertical component in a direction substantially perpendicular to the surfaces of the two substrates 110 and 210, and may have a fringe field component formed by the edges of the patterns such as the plurality of branch portions 194 of the pixel electrode 191. In response to the electric field, the liquid crystal molecules 31 may be inclined in a direction substantially parallel to the surfaces of the substrates 110 and 210 and may be inclined in a direction substantially parallel to the direction in which the branch portions 194 extend. Since the pixel electrode 191 of one pixel PX includes a plurality of branch portions 194 extending in four different directions, the liquid crystal layer 3 corresponding to each pixel electrode 191 may be includes four different areas where the tilt directions of the liquid crystal molecules 31 are different from each other.

The detailed structure of the branch portion 194 of the pixel electrode 191 is described with reference to FIG. 5 and FIG. 6.

Referring to FIG. 5 and FIG. 6, the branch electrode 194 of the pixel electrode 191 of the display device according to an exemplary embodiment of the present inventive concept has a shape that is bent at least once. Specifically, the branch electrode 194 may include oblique portions 194a and 194c which extend in an oblique direction with respect to the first direction DR1 and the second direction DR2, and the transverse portions 194b which extend in a direction different from the direction the oblique portions 194a and 194c extend.

When a direction substantially perpendicular to the direction in which the data line 171 extends in the transmissive region of the pixel PX is referred to as a fourth direction DR4, each of the transverse portions 194b form a smaller acute angle with the fourth direction DR4 than the oblique portions 194a and 194c. In other words, the oblique portions 194a and 194c may have a smaller acute angle with the extending direction of the data line 171 than the transverse portion 194b. The fourth direction DR4 may be the same as the width direction of the data line 171 disposed in the transmissive area of the pixel PX.

Specifically, referring to FIG. 6, when an acute angle formed by the oblique portion 194a with the fourth direction DR4 is referred to as an angle A1, an acute angle formed by the oblique portion 194c with the fourth direction DR4 is referred to as an angle A2, and an acute angle formed by the transverse portion 194b with the fourth direction DR4 is referred to as an angle A3, the angle A3 is smaller than the angle A1 and/or the angle A2. Here, the angle A1 and the angle A2 may be different from each other or may be the same. Hereinafter, an example in which the two angles A1 and A2 are the same is mainly described. The angle A3 may be greater than or equal to 0 degree and less than 45 degrees.

Since the data line 171 according to the exemplary embodiment extends parallel to the second direction DR2 within the transmissive region of the pixel PX, the fourth direction DR4 may be the same direction as the first direction DR1.

According to an exemplary embodiment, the transverse portion 194b may extend approximately in the first direction DR1.

In a plan view, the data line 171 may overlap the transverse portion 194b of the pixel electrode 191. In other word, the data line 171 may cover at least a partial portion of the transverse portion 194b of the pixel electrode 191 in a plan view. In FIG. 5, both left and right edges of the data line 171 that are parallel to each other may overlap the transverse portion 194b. However, only one of the left and right edges of the data line 171 may overlap the transverse portion 194b and the other of the left and right edges of the data line 171 may not overlap the transverse portion 194b in a plan view.

Referring to FIG. 5, a width W2 (or the first direction DR1) of the transverse portion 194b in the fourth direction DR4 may be equal to or greater than the width W1 (or the first direction DR1) of the data line 171 in the fourth direction DR4. FIG. 5 shows an example in which the width W1 and the width W2 are substantially equal to each other.

The width W2 of the first direction DR1 of the transverse portion 194*b* may be, for example, about 1 micrometer to about 10 micrometers.

According to an embodiment of the present inventive concept, the transverse portion 194*b* may be disposed between the two oblique portions 194*a* and 194*c* and may be connected to or extend from the two oblique portions 194*a* and 194*c*.

The width of the oblique portions 194*a* and 194*c* perpendicular to the extending direction of the oblique portions 194*a* and 194*c* may be constant. The width of the oblique portions 194*a* and 194*c* perpendicular to the extending direction of the oblique portions 194*a* and 194*c* and the width of the transverse portion 194*b* perpendicular to the extending direction of the transverse portion 194*b* may be different from each other. The width of the oblique portions 194*a* and 194*c* perpendicular to the extending direction of the branch electrode 194 including the oblique portions 194*a* and 194*c* may be substantially constant and the width of the transverse portion 194*b* perpendicular to the extending direction of the transverse portion 194*b* may be substantially constant too.

In the manufacturing process of the data line 171, due to a misalignment of the data line 171 in the fourth direction DR4 (e.g., the first direction DR1) perpendicular to the direction in which the data line 171 extends or an etching result, for example, an under etching or over etching of the data line 171 and a width of the data line 171 may be deviated from the expectations. A range in which the data line 171 may be disposed depending on the misalignment of the data line 171 and/or the etching result of the data line 171 is referred to as a dispersion range DTR. The dispersion range DTR may be smaller than half of the length of the pixel electrode 191 in the first direction DR1.

The transverse portion 194*b* according to the present exemplary embodiment may be disposed within the dispersion range DTR.

Referring to FIG. 6, in the dispersion range DTR, a part of the oblique portions 194*a* and 194*c* connected to or extending from the transverse portion 194*b* may be further included. That is, the length L1 of the oblique portion 194*a* and the length L2 of the oblique portion 194*c*, which are disposed in the dispersion range DTR, may be equal to or larger than 0. Based on an imaginary center line passing through a center of the transverse portion 194*b* in a second direction DR2 and substantially extending in the first direction DR1, a total sum of the width W2 of the transverse portion 194*b* in the fourth direction DR4, L1*Cos A1 and L2*Cos A2 may be larger than or equal to the dispersion range DTR.

According to the present exemplary embodiment, in the manufacturing process of the data line 171, even if the position and/or the width W1 of the data line 171 is deviated from the expectations, a change in an overlapping area between the data line 171 and the branch electrode 194 of the pixel electrode 191 may be minimized. Therefore, the influence on the arrangement of the liquid crystal layer 3 due to the potential of the data line 171 and the change in the transmittance of the pixel PX are not largely generated.

This effect is described with reference to FIG. 8 and FIG. 9, which are comparative examples, together with the drawings described above.

Figure 8:
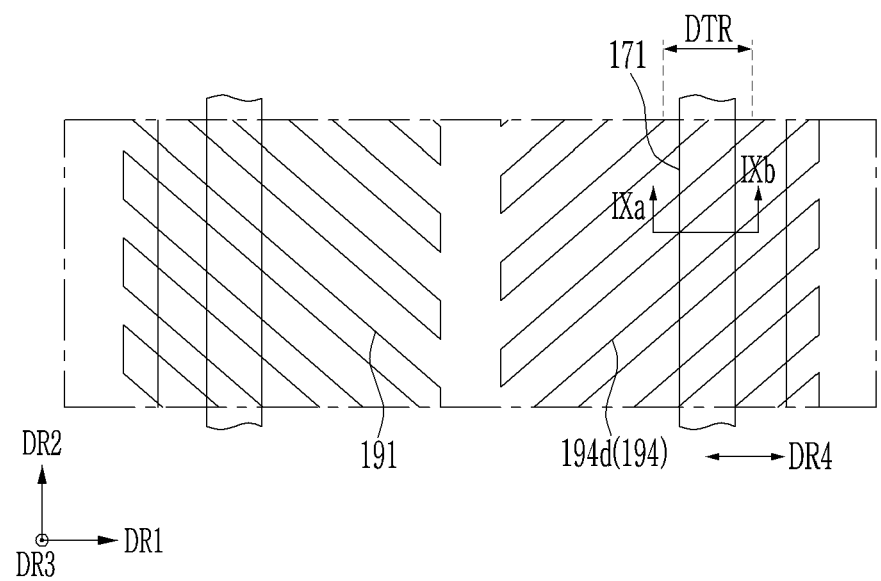
FIG. 8 is a top plan view showing a part of one pixel of a display device according to a comparative example.
Figure 9:
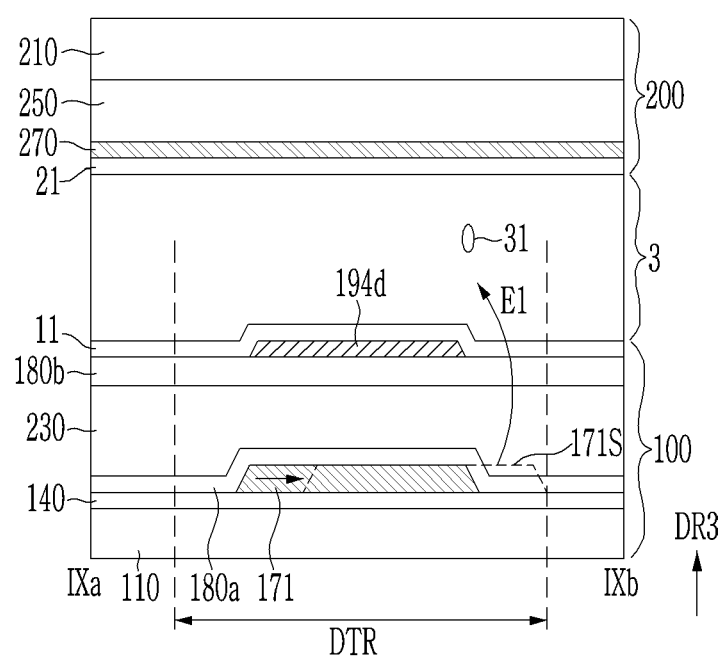
FIG. 9 is a cross-sectional view of a display device shown in FIG. 8 taken along a line IXa-IXb.

FIG. 8 is a top plan view showing a part of one pixel of a display device according to a comparative example, and FIG. 9 is a cross-sectional view of a display device shown in FIG. 8 taken along a line IXa-IXb.

Referring to FIG. 8, the display device according to the present comparative example is similar to most of the display device according to the above-described exemplary embodiment of the present inventive concept, however the branch portion 194 of the pixel electrode 191 includes only one oblique portion 194*d* without including the transverse portion 194*b* like in the exemplary embodiment of the present inventive concept, and the data line 171 overlaps the oblique portion 194*d*. The oblique portion 194*d* may have a structure and features similar to those of the oblique portions 194*a* and 194*c* of the pixel electrode 191 according to the exemplary embodiment of the present inventive concept described above.

Referring to FIG. 9, the misalignment or the under etch or the over etch of the data line 171 is occurred in the manufacturing process of the data line 171 such that the data line 171 moves in the fourth direction DR4 or becomes wider than the predetermined width of the data line 171.

The error data line 171S may be disposed within the dispersion range DTR of the data line 171.

Referring to FIG. 8 and FIG. 9, since the oblique portion 194*d* of the branch portion 194 of the pixel electrode 191 overlapping the data line 171 is inclined with respect to the fourth direction DR4, the error data line 171S has a portion that does not overlap the oblique portion 194*d* of the pixel electrode due to the misalignment or the under etch or the over etch of the data line 171. Accordingly, as shown in FIG. 9, the portion where the pixel electrode 191 is not disposed between the error data line 171S and the liquid crystal layer 3 in the third direction DR3 occurs, so that the electric field E1 depending on the potential of the error data line 171S affects the arrangement of the liquid crystal molecules 31 of the liquid crystal layer 3. As a result, the transmittance of the pixel PX may be changed due to the error data line 171S.

Compared with this, referring to FIG. 5 to FIG. 7 of an exemplary embodiment of the present inventive concept, in the manufacturing process of the data line 171, the misalignment and/or the under etch or the over etch of the data line 171 is occurred such that the data line 171 moves in the fourth direction DR4 as shown by an arrow in FIG. 7 and/or becomes wider than the predetermined width is described.

According to the present exemplary embodiment, most of the error data line 171S in the fourth direction DR4 may overlap the branch portion 194 of the pixel electrode 191. Accordingly, as shown in FIG. 7, the branch portion 194 of the pixel electrode 191 is still disposed between the error data line 171S and the liquid crystal layer 3 in the third direction DR3, so the electric field E2 due to the potential of the error data line 171S may be shielded by the branch portion 194 and thus may not reach the liquid crystal layer 3. Therefore, even if there are the misalignment and/or the under etch or the over etch of the data line 171, a large change in the transmittance of the pixel PX may not occur.

Next, the display device according to an exemplary embodiment is described with reference to FIG. 10 as well as the above-described drawings.

Figure 10:
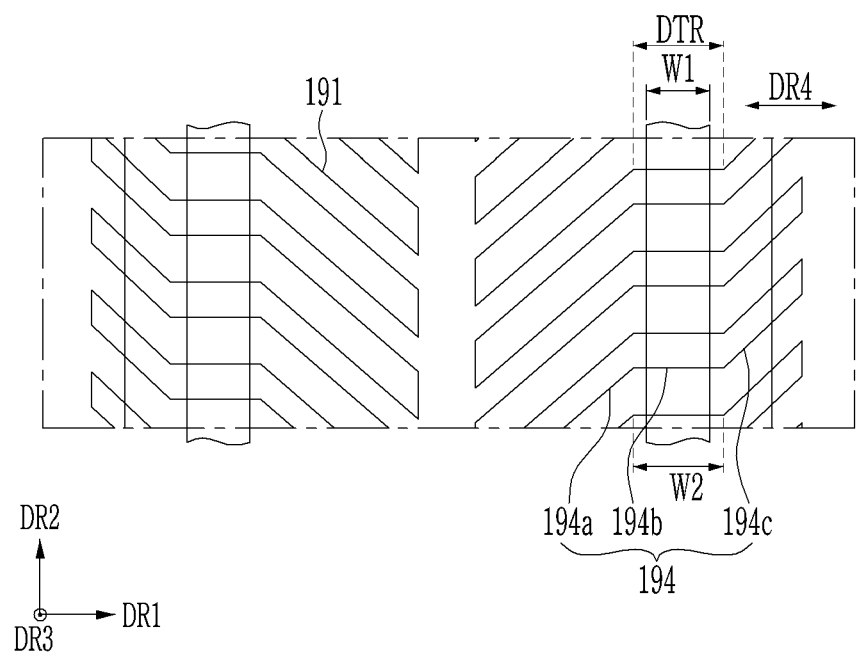
FIG. 10 is a top plan view showing a part of one pixel of a display device according to an exemplary embodiment of the present inventive concept.

FIG. 10 is a top plan view of a part of one pixel of a display device according to an exemplary embodiment of the present inventive concept.

Referring to FIG. 10, the display device according to the present exemplary embodiment is the same as the display device according to the above-described exemplary embodiment, except that the width W2 of the transverse portion 194*b* of the branch portion 194 of the pixel electrode 191 in the fourth direction DR4 (or the first direction DR1) may be larger than the width W1 of the data line 171 in the fourth direction DR4 (or the first direction DR1). The width W2 of the transverse portion 194b of the branch portion 194 of the pixel electrode 191 may be greater than or equal to the dispersion range DTR of the data line 171.

Next, the effects according to the above-described several exemplary embodiments are described with reference to FIG. 11 and FIG. 12 as well as the above-described drawings.

Figure 11:
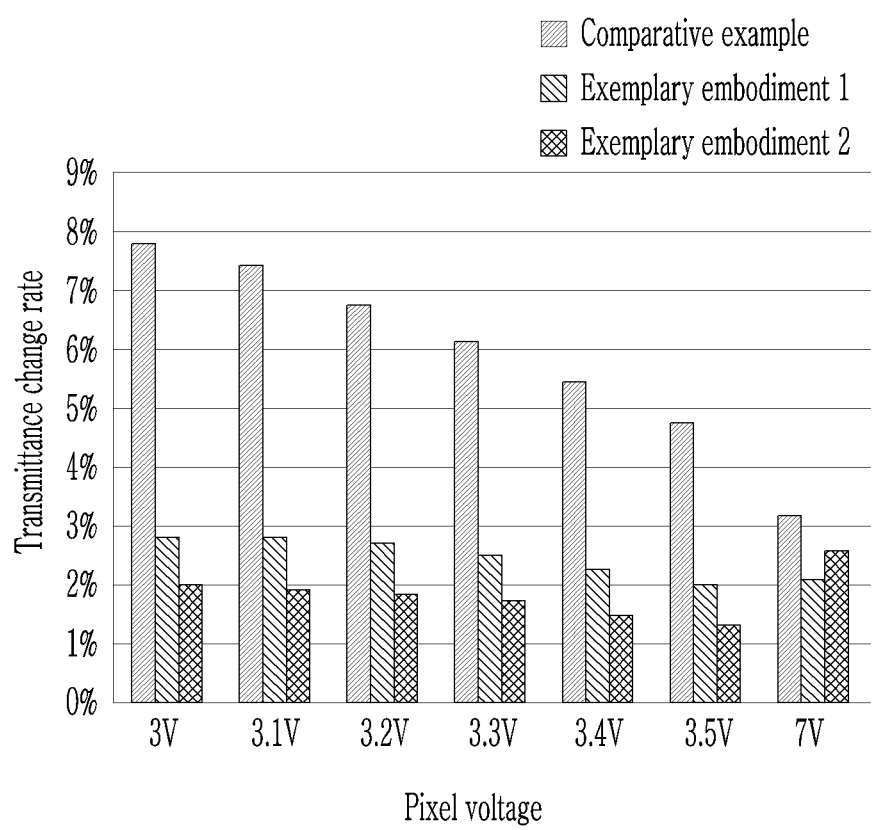
FIG. 11 is a graph illustrating a change rate of transmittance of a pixel according to a change in a misalignment of a signal line in a display device according to a comparative example and an exemplary embodiment of the present inventive concept.
Figure 12:
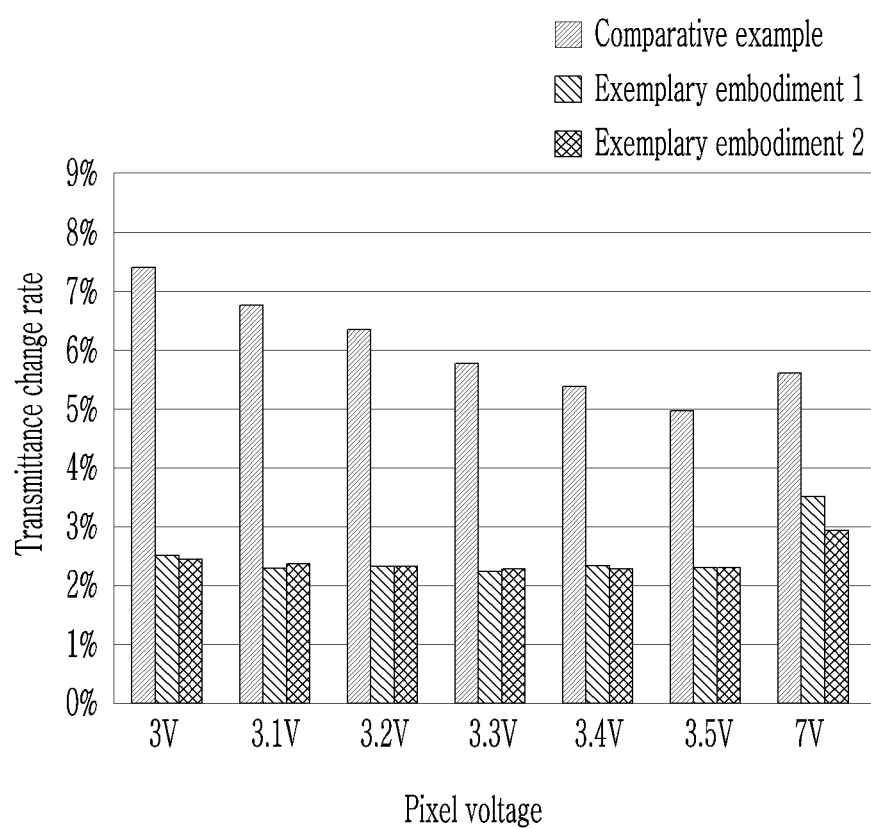
FIG. 12 is a graph showing a change rate of transmittance of a pixel according to a width change of a signal line in a display device according to a comparative example and an exemplary embodiment of the present inventive concept.

FIG. 11 is a graph illustrating a change rate of transmittance of a pixel according to a change in an misalignment of a signal line in a display device according to a comparative example and an exemplary embodiment of the present inventive concept, and FIG. 12 is a graph showing a change rate of transmittance of a pixel according to a width change of a signal line in a display device according to a comparative example and an exemplary embodiment of the present inventive concept.

FIG. 11 shows the change rate of the transmittance of the pixel PX for various voltage values of the pixel voltage which is a voltage difference between the pixel electrode 191 and the common electrode 270 when a misalignment of approximately 1 micrometer is occurred in the data line 171 according to an exemplary embodiment of the present inventive concept.

FIG. 12 shows the change rate of the transmittance of the pixel PX for various voltage values of the pixel voltage when the width of the data line 171 increases or decreases approximately 0.4 micrometers in the fourth direction DR4 (or the first direction DR1) according to an exemplary embodiment of the present inventive concept.

In FIG. 11 and FIG. 12, the comparative example is a graph for the comparative example shown in FIG. 8 and FIG. 9 described above, an exemplary embodiment 1 is a graph for the exemplary embodiment of the present inventive concept shown in FIG. 5 to FIG. 7 described above in which the width of the data line 171 and the width of the transverse portion 194b in the fourth direction DR4 (or the first direction DR1) of are respectively approximately 5 micrometers, and an exemplary embodiment 2 is a graph for the exemplary embodiment of the present inventive concept shown in FIG. 10 in which the width of the data line 171 in the fourth direction DR4 (or the first direction DR1) is for example approximately 5 micrometers and the width of the transverse portion 194b in the fourth direction DR4 (or the first direction DR1) is, for example, approximately 7.8 micrometers.

Referring to the graph of FIG. 10 and FIG. 11, compared with the case of the comparative example as the display device including the pixel electrode 191 without the transverse portion 194b, in the display device according to an exemplary embodiment of the present inventive concept, it may be confirmed that the change rate of the transmittance of the pixel PX is not large even when the misalignment and/or the under etching or the over etching is occurred. Therefore, according to the exemplary embodiments of the present inventive concept, even when the misalignment and/or the under etching or the over etching is occurred, the change in the transmittance of the pixel PX may be minimized, thereby increasing the display quality.

Next, the display device according to an exemplary embodiment of the present inventive concept is described with reference to FIG. 13 to FIG. 15 as well as the above-described drawings. The same description of the same parts as the above-described exemplary embodiment is omitted, and the same reference numerals are used for the same components.

Figure 13:
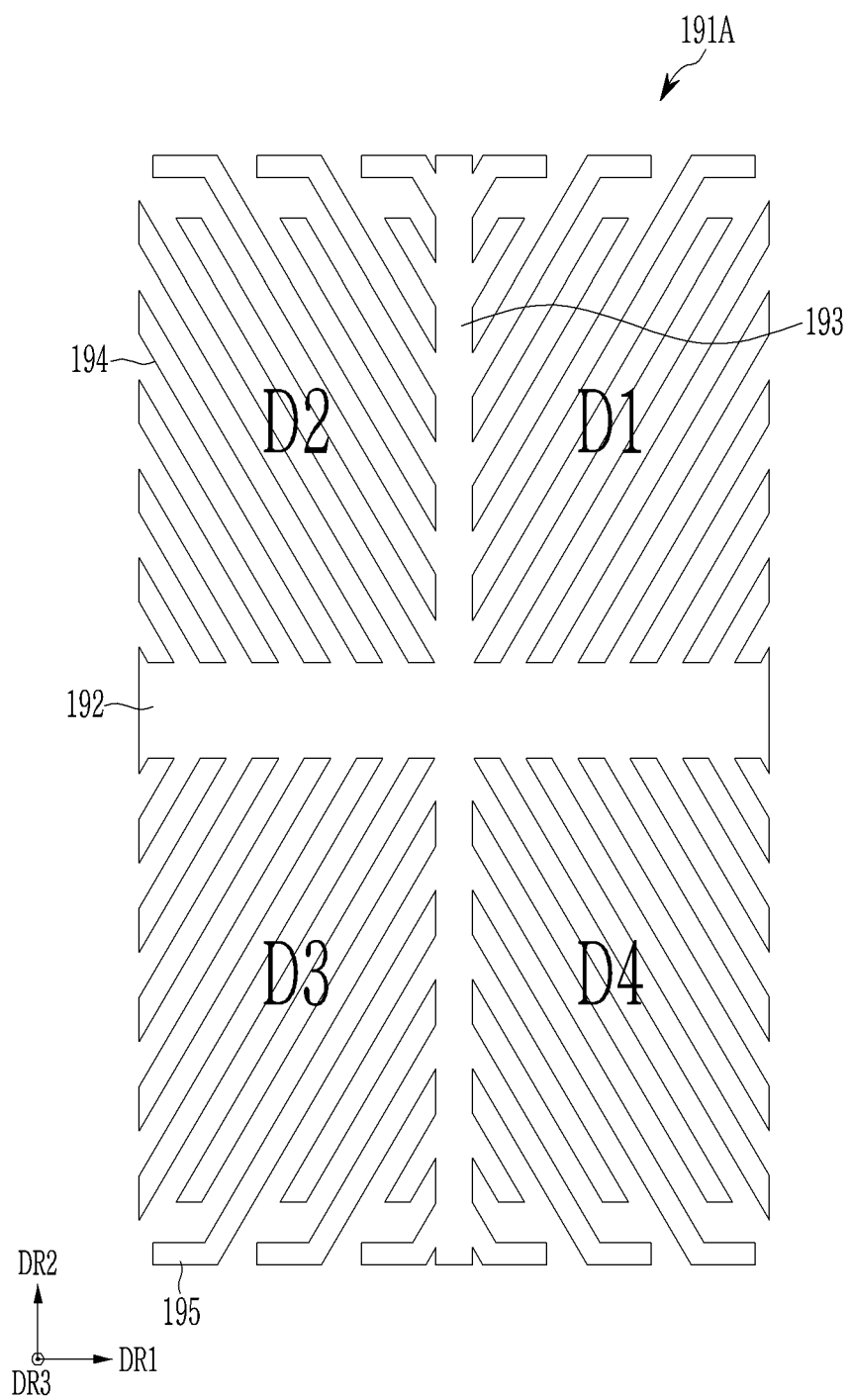
FIG. 13, FIG. 14 and FIG. 15 are top plan views of a pixel electrode of a display device according to an exemplary embodiment of the present inventive concept, respectively.
Figure 14:
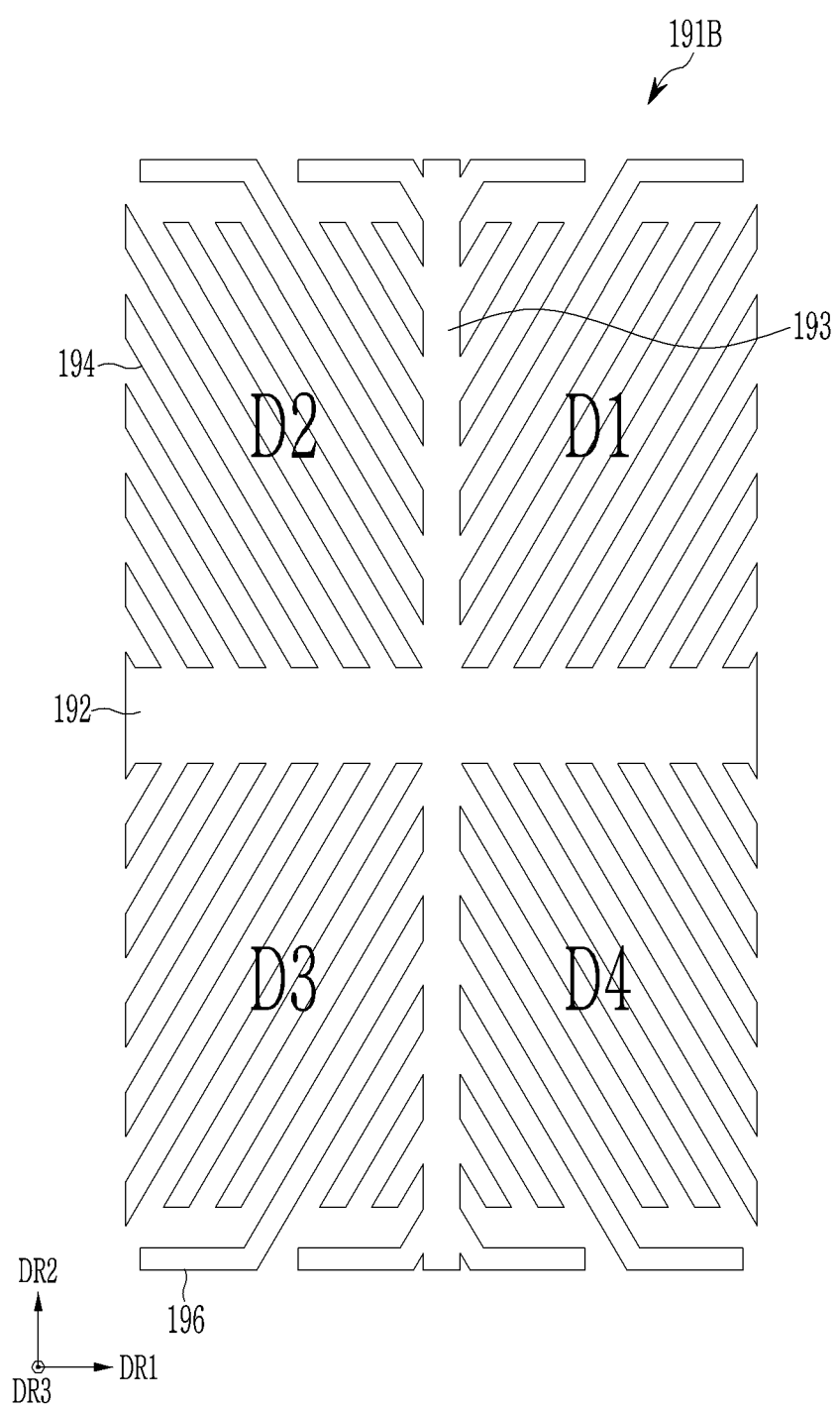
Figure 15:
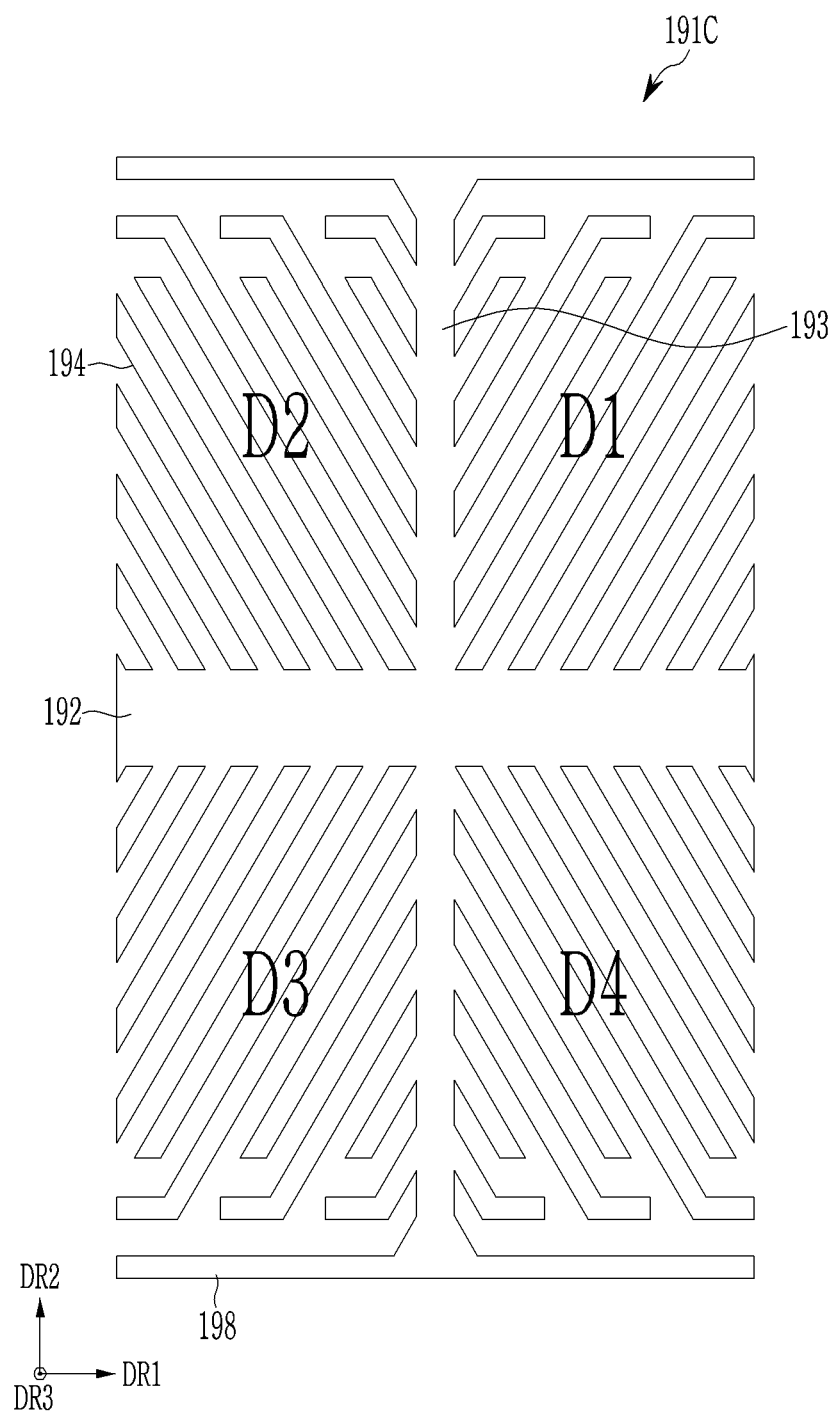

FIG. 13, FIG. 14, and FIG. 15 are top plan views of a pixel electrode of a display device according to an exemplary embodiment of the present inventive concept.

First, referring to FIG. 13, a pixel electrode 191A included in the display device according to the present exemplary embodiment has the same structure and features as most of the above-described pixel electrode 191, however it may further include an edge portion 195 connected to or extending from the end portion of the branch electrode 194 and/or the longitudinal stem 193.

The edge portion 195 may extend in parallel with the first direction DR1 along the edges of the upper and lower ends of the pixel electrode 191A. The length of the first direction DR1 of the edge portion 195 may be less than half the length of the first direction DR1 of the pixel electrode 191.

The edge portion 195 may be connected to or extend from the end portions of two or more branch portions 194 among a plurality of branch portions 194 respectively disposed in four domains D1, D2, D3, and D4 defined by the transverse stem 192 and the longitudinal stem 193 of the pixel electrode 191A. Every other branch portion 194 may have the edge portion 195 disposed in four domains D1, D2, D3, and D4. Outmost edge portions 195 in four domains D1, D2, D3, and D4 may extend to the edge of the pixel electrode 191A in the first direction.

Next, referring to FIG. 14, a pixel electrode 191B included in the display device according to the present exemplary embodiment is the same as most of the pixel electrode 191A according to the exemplary embodiment shown in FIG. 13, in that it includes an edge portion 196 connected to or extending from the end portion of the branch electrode 194 and/or the longitudinal stem 193. The edge portion 196 may extend approximately in parallel to the first direction DR1 along the edges of the upper and lower ends of the pixel electrode 191B. The length of the first direction DR1 of the edge portion 196 may be smaller than the length of the first direction DR1 of the pixel electrode 191.

However, the edge portion 196 may be connected to or extend from the end portion only of one branch portion 194 among the plurality of branch portions 194 respectively disposed in four domains D1, D2, D3, and D4 defined by the transverse stem 192 and the longitudinal stem 193 of the pixel electrode 191B. End of the edge portion 196 may extend to the edge of the pixel electrode 191B in the first direction.

Next, referring to FIG. 15, a pixel electrode 191C included in the display device according to the present exemplary embodiment is the same as most of the pixel electrodes 191A and 191B according to the exemplary embodiments shown in FIG. 13 or FIG. 14, however it may further include an edge portion 198 disposed outside of the edge portions 195 and 196.

The edge portion 198 may be connected to or extend from the extending portion of the longitudinal stem 193, and particularly may extend approximately parallel to the first direction DR1 along the edges of the lower and upper ends of the pixel electrode 191C. The length of the first direction DR1 of the edge portion 198 may be substantially the same as the length of the first direction DR1 of the pixel electrode 191.

Next, the display device according to an exemplary embodiment of the present inventive concept is described with reference to FIG. 16 as well as FIG. 5 described above.

Figure 16:
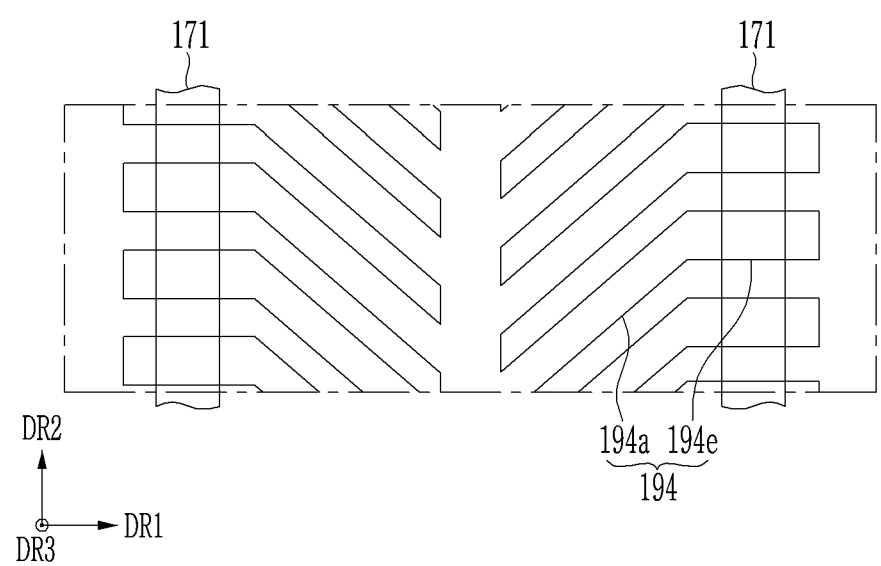
FIG. 16 is a top plan view showing a part of one pixel of a display device according to an exemplary embodiment of the present inventive concept.

FIG. 16 is a top plan view showing a part of one pixel of a display device according to an exemplary embodiment of the present inventive concept, Referring to FIG. 16, the display device according to the present exemplary embodiment may be substantially the same as most of the display device according to the exemplary embodiment described above, but the shape of the pixel electrode may be different.

In detail, the branch electrode 194 of the pixel electrode may include the oblique portion 194a and a transverse portion 194e connected to or extending from the end of the oblique portion 194a. The shape and characteristics of the transverse portion 194e may be the same as the transverse portion 194b of the above-described embodiment. The transverse portion 194e according to the present embodiment may be disposed adjacent to the edge of the pixel electrode.

In a plan view, the data line 171 may overlap the transverse portion 194e of the pixel electrode 191. As shown in FIG. 16, the left and right edges of the data line 171 that are parallel to each other may overlap the transverse portion 194e, or alternatively, only one of the left and right edges of the data line 171 may overlap the transverse portion 194e.

In addition, the relationships and effects between the data line 171 and the branch electrode 194 may be the same as in the above-described exemplary embodiment.

Next, the display device according to an exemplary embodiment of the present inventive concept is described with reference to FIG. 17 as well as above-described FIG. 2 to FIG. 4.

Figure 17:
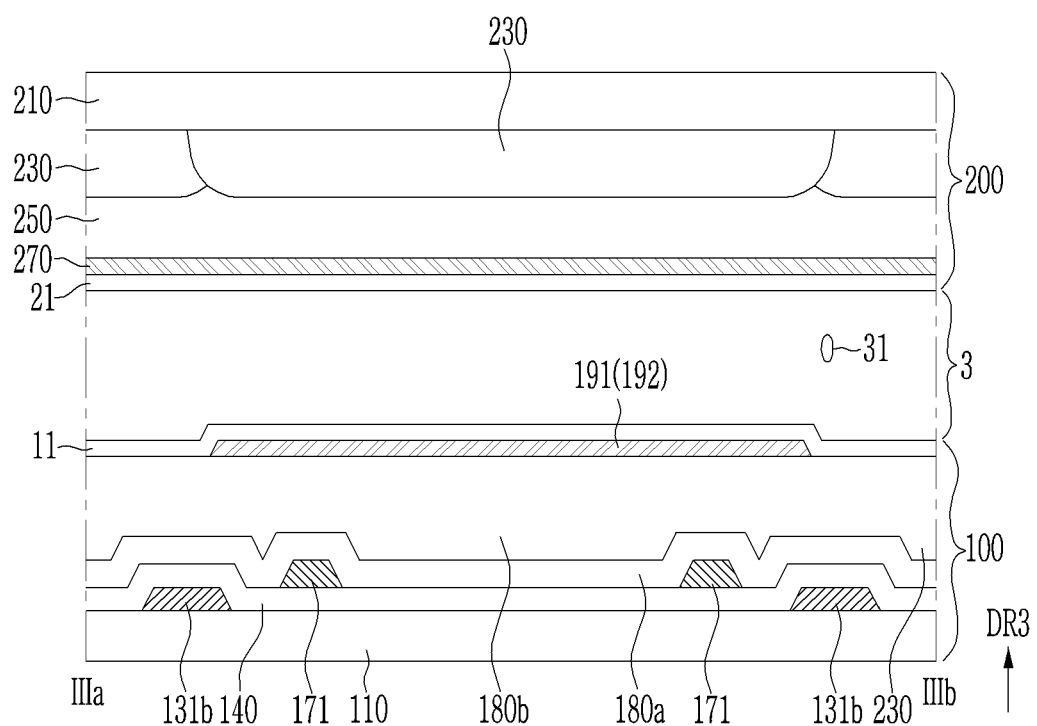
FIG. 17 is a variation of a cross-sectional view of a display device shown in FIG. 2 taken along a line IIIa-IIIb.

FIG. 17 is a variation of a cross-sectional view of a display device shown in FIG. 2 taken along a line IIIc-IIIb.

Referring to FIG. 17, the display device according to the present exemplary embodiment is mostly the same as the display device according to the above-described exemplary embodiment, but the color filter 230 may be disposed on the second display panel 200 instead of the first display panel 100. That is, the plurality of color filters 230 may be disposed below the second substrate 210, and the insulating layer 250 may be disposed below the plurality of color filters 230. The light blocking member 220 described above may be disposed between the second substrate 210 and the insulating layer 250.

According to another exemplary embodiment, the light blocking member 220 may also be disposed in the first display panel 100.

Next, the display device according to an exemplary embodiment of the present inventive concept is described with reference to FIG. 18 to FIG. 20 as well as FIG. 2 to FIG. 4 described above.

Figure 18:
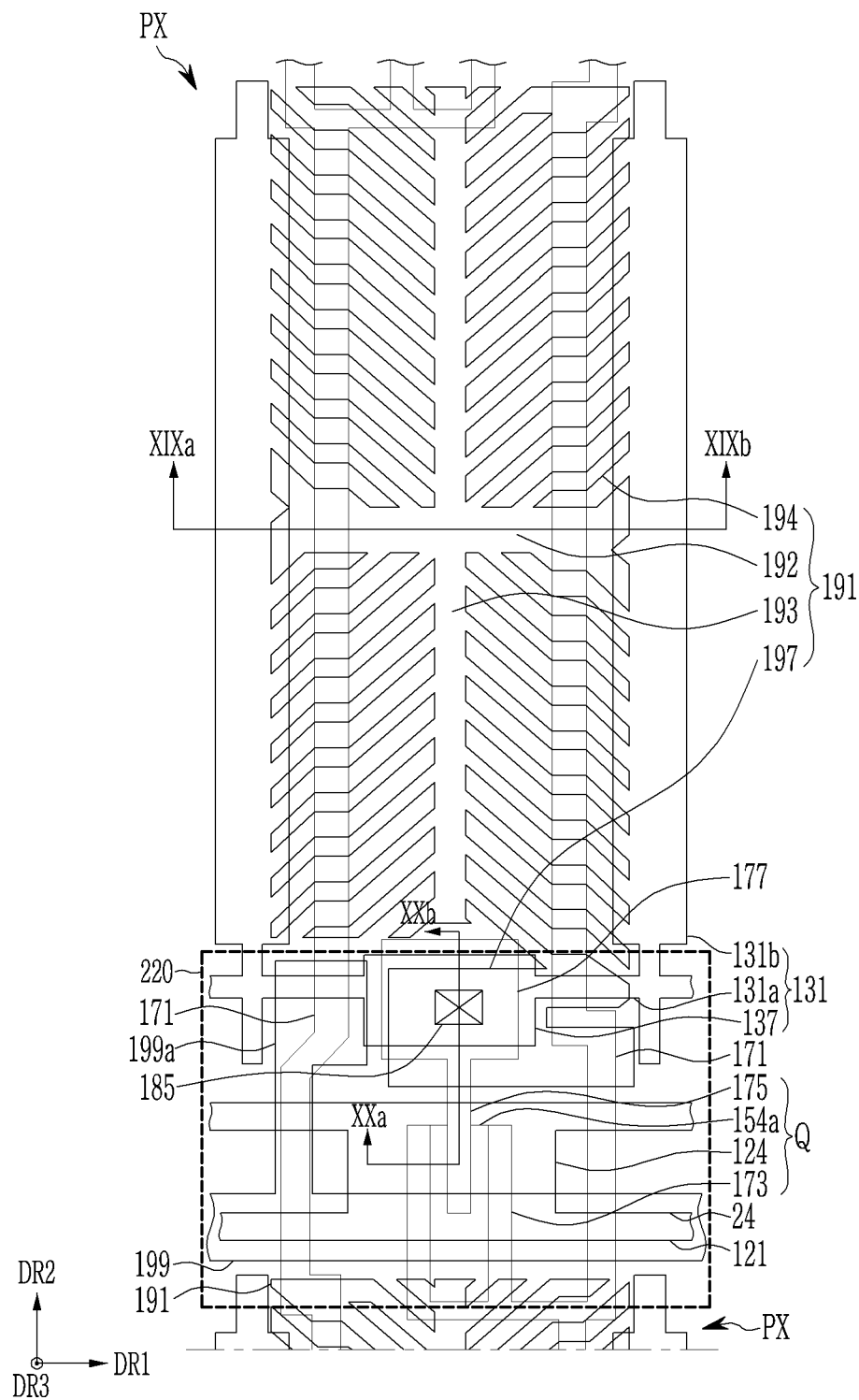
FIG. 18 is a layout view of one pixel of a display device according to an exemplary embodiment of the present inventive concept, FIG. 19 a cross-sectional view of a display device shown in FIG. 18 taken along a line XIXa-XIXb.
Figure 19:
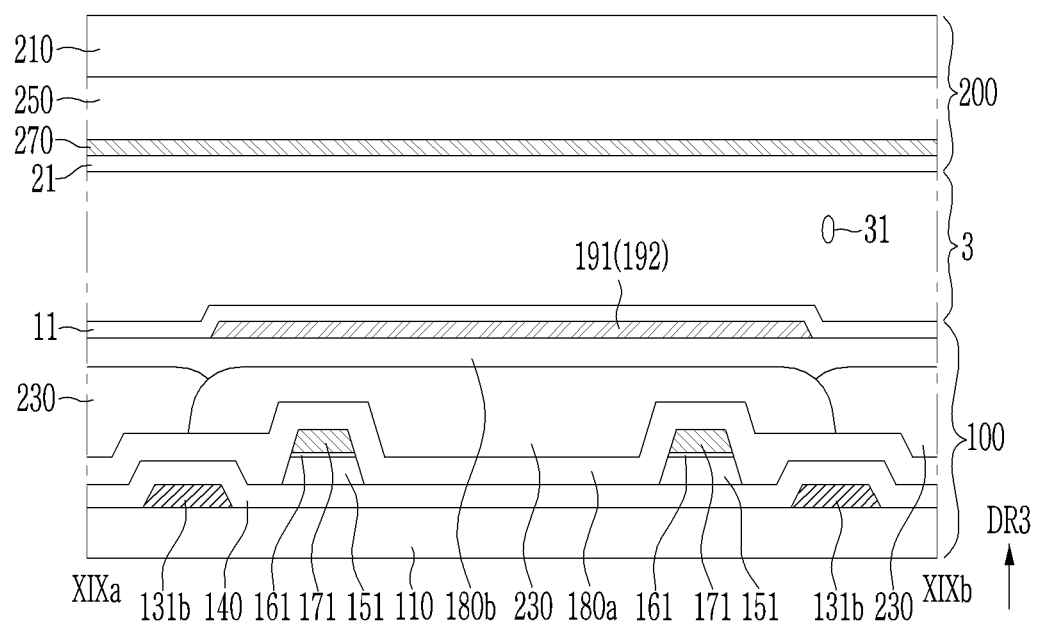
Figure 20:
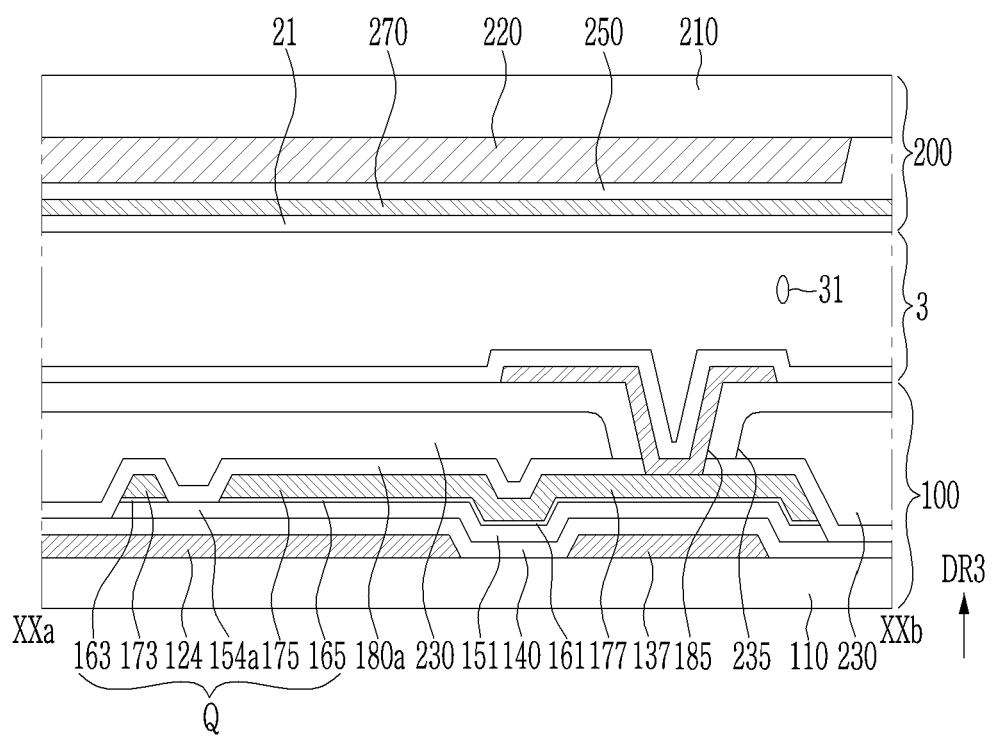
FIG. 20 is a cross-sectional view of a display device shown in FIG. 18 taken along a line XXa-XXb.

FIG. 18 is a layout view of one pixel of a display device according to an exemplary embodiment of the present inventive concept, FIG. 19 a cross-sectional view of a display device shown in FIG. 18 taken along a line XIXa-XIXb, and FIG. 20 is a cross-sectional view of a display device shown in FIG. 18 taken along a line XXa-XXb.

This present exemplary embodiment is mostly the same as the above-described embodiment, but the semiconductor layer may be different. In detail, the semiconductor layer may include a semiconductor 151 disposed between the data conductive layer including the data line 171, the source electrode 173, the plurality of drain electrodes 175, and the gate insulating layer 140. The semiconductor 151 includes a channel portion 154a disposed between the source electrode 173 and the drain electrode 175, as the channel of the thin film transistor Q. That is, the channel portion 154a is not covered by the data conductive layer.

An ohmic contact layer 161 may be disposed between the semiconductor 151 and the data conductive layer. The ohmic contact layer 161 may include ohmic contact layers 163 and 165 disposed under the source electrode 173 and the drain electrode 175.

The planar shape of the semiconductor 151 except for the channel portion 154a and the ohmic contact layer 161 may be substantially similar to the planar shape of the data conductive layer. That is, the edge of the semiconductor 151 except the channel portion 154a or the edge of the ohmic contact layer 161 except the channel portion 154a may extend substantially parallel to the edge of the data conductive layer.

In the above description, the case where the signal line passing through the transmission region of the pixel electrode is the data line 171 has been described as a main example, but it is not limited thereto, and the present inventive concept may be equally applied to the case in which the data line 171 and/or other signal lines pass through the transmissive region of the pixel electrode.

While this inventive concept has been described in connection with what is presently considered to be practical exemplary embodiments, it is to be understood that the inventive concept is not limited to the disclosed embodiments. On the contrary, it is intended to cover various modifications and equivalent arrangements included within the spirit and scope of the appended claims.

What is claimed is:

1. A display device comprising:
   a signal line extending in a direction perpendicular to a first direction;
   a transistor electrically connected to the signal line; and
   a pixel electrode electrically connected to the transistor and including a plurality of branch electrodes,
   wherein at least two of the plurality of branch electrodes each includes a first portion and a second portion extending from the first portion in the first direction,
   wherein an acute angle formed between an extending direction of the second portion and the first direction is smaller than an acute angle formed between an extending direction of the first portion and the first direction,
   wherein the signal line overlaps the second portion in a plan view, and
   wherein the second portions of the at least two of the plurality of branch electrodes are spaced apart from one another in a region overlapping the signal line in the plan view.

2. The display device of claim 1, further comprising a plurality of pixels,
   wherein each pixel includes a transmissive region through which light is capable of being transmitted and a light blocking region through which light is not capable of being transmitted,
   wherein the transistor is disposed in the light blocking region, and
   wherein the signal line extends in the direction perpendicular to the first direction at the transmissive region.

3. The display device of claim 2, wherein two parallel edges of the signal line overlap the second portion.

4. The display device of claim 2, wherein a width of the second portion in the first direction is greater than or equal to a width of the signal line in the first direction.

5. The display device of claim 2, wherein the signal line is a data line transmitting a data voltage to the transistor.

6. The display device of claim 2, wherein the at least two of the plurality of branch electrodes each further includes a third portion extending from the second portion,
   wherein the second portion is disposed between the first portion and the third portion, and wherein the acute angle formed between the extending direction of the second portion and the first direction is smaller than an acute angle formed between an extending direction of the third portion and the first direction.

7. The display device of claim 6, wherein the extending direction of the first portion and the extending direction of the third portion are the same.

8. The display device of claim 6, wherein a width of the first portion and a width of the third portion are constant.

9. The display device of claim 2, wherein the pixel electrode further includes:
a transverse stem extending in a different direction from the extending direction of the first portion; and
a longitudinal stem extending in a direction perpendicular to an extending direction of the transverse stem and intersecting the transverse stem, and
wherein the at least two of the plurality of branch electrodes each extends obliquely from the transverse stem or the longitudinal stem.

10. The display device of claim 2, further comprising:
a common electrode opposing the pixel electrode; and
a liquid crystal layer including liquid crystal molecules and interposed between the pixel electrode and the common electrode.

11. A display device comprising:
a pixel including a transmissive region and a light blocking region;
a signal line extending in a first direction in the transmissive region;
a pixel electrode disposed at the transmissive region; and
a transistor disposed at the light blocking region,
wherein the pixel electrode includes a plurality of branch electrodes, at least two of the plurality branch electrodes each including a first portion extending obliquely to the first direction and a second portion extending in a second direction perpendicular to the first direction in a plan view,
wherein the signal line overlaps the second portion in the plan view, and
wherein the second on of the at least two of the plurality of branch electrodes are spaced apart from one another in a region overlapping the signal line in the plan view.

12. The display device of claim 11, wherein an acute angle formed between an extending direction of the second portion and the second direction is smaller than an acute angle formed between an extending direction of the first portion and the second direction.

13. The display device of claim 11, wherein two parallel edges of the signal line overlap the second portion.

14. The display device of claim 11, wherein a width of the second portion in the second direction is larger than or equal to a width of the signal line in the second direction.

15. The display device of claim 11, wherein the signal line is a data line transmitting a data voltage to the transistor.

16. The display device of claim 11, wherein the at least two of the plurality of branch electrodes each further includes a third portion extending from the second portion,
wherein the second portion is disposed between the first portion and the third portion, and
wherein an acute angle formed between an extending direction of the second portion and the second direction is smaller than an acute angle formed between an extending direction of the third portion and the second direction.

17. The display device of claim 16, wherein an extending direction of the first portion and the extending direction of the third portion are the same.

18. The display device of claim 17, wherein widths of the first portion and the third portion are constant.

19. The display device of claim 11, wherein the pixel electrode further includes:
a transverse stem extending in the second direction; and
a longitudinal stem extending in a direction perpendicular to an extending direction of the transverse stem, and intersecting the transverse stem, and
wherein the plurality of branch electrodes extend obliquely from the transverse stem or the longitudinal stem.

20. A display device comprising:
a substrate;
a signal line extending along a first direction and a transistor disposed on the substrate; and
a pixel electrode disposed on the transistor and the signal line,
wherein the pixel electrode includes a plurality of branch electrodes, at least two of the plurality of branch electrodes each including a first portion extending obliquely to the first direction and a second portion extending in a second direction perpendicular to the first direction in a plan view,
wherein the signal line overlaps the second portion in the plan view, and
wherein the second onions of the at least two of the plurality of branch electrodes are spaced apart from one another in a region overlapping the signal line in the plan view.

* * * * *